(12) United States Patent
Hog et al.

(10) Patent No.: US 12,547,134 B2
(45) Date of Patent: Feb. 10, 2026

(54) AUTOMATION CONTROLLER AND METHOD FOR OPERATING THE AUTOMATION CONTROLLER

(71) Applicant: Siemens Aktiengesellschaft, Munich (DE)

(72) Inventors: Ronny Hog, Kümmersbruck (DE); André Kamp, Baiersdorf (DE); Sebastian Schötz, Hahnbach (DE); Markus Walter, Bamberg (DE); Ulrich-Volker Lang, Heroldsbach (DE)

(73) Assignee: Siemens Aktiengesellschaft, Munich (DE)

( * ) Notice: Subject to any disclaimer, the term of this patent is extended or adjusted under 35 U.S.C. 154(b) by 357 days.

(21) Appl. No.: 18/238,893

(22) Filed: Aug. 28, 2023

(65) Prior Publication Data

US 2024/0069509 A1    Feb. 29, 2024

(30) Foreign Application Priority Data

Aug. 29, 2022   (EP) ..................................... 22192580

(51) Int. Cl.
*G05B 15/02*    (2006.01)
(52) U.S. Cl.
CPC ................................... *G05B 15/02* (2013.01)
(58) Field of Classification Search
CPC ...................................................... G05B 15/02
See application file for complete search history.

(56) References Cited

U.S. PATENT DOCUMENTS

2008/0291907 A1    11/2008   Rogasch

FOREIGN PATENT DOCUMENTS

EP          3819804        5/2021

*Primary Examiner* — Gary Collins
(74) *Attorney, Agent, or Firm* — Cozen O'Connor

(57) ABSTRACT

Automation controller and method for operating the automation controller, wherein the automation controller includes Ethernet channels to which network interfaces can be assigned via a first register with a first register value and a second register with a second register value, where the assignments are made and these are examined for variances via test values.

14 Claims, 4 Drawing Sheets

FIG 2

|  | HWIF1 | | | | HWIF1 | |
| --- | --- | --- | --- | --- | --- | --- |
|  | E11 | E12 | E13 | E14 | E21 | E22 |
| K1 | P1 | P2 | ---- | ---- | P3 | ---- |
| K2 | P1 | ---- | ---- | ---- | P3 | P2 |
| K3 | P1 | P2 | P3 | ---- | ---- | ---- |
| K4 | P1 | P2 | ---- | ---- | ---- | P3 |
| K5 | P1 | P2 | ---- | ---- | ---- | ---- |
| K6 | P1 | ---- | ---- | ---- | P2 | ---- |
| ... | | | | | | |

|  |  |  | Prüfwerte | |
| --- | --- | --- | --- | --- |
|  | HWIF1 | HWIF2 | CV_HWIF1 (HWIF1 x 0x200$_H$*$^)$ | CV_HWIF2 (HWIF2 x 0x200 0000$_H$*$^)$ |
| K1 | 0x7710$_H$ | 0x72$_H$ | 0xEE 2000$_H$ | 0xE400 0000$_H$ |
| K2 | 0x7770$_H$ | 0x12$_H$ | 0xEE E000$_H$ | 0x2400 0000$_H$ |
| K3 | 0x7210$_H$ | 0x77$_H$ | 0xE4 2000$_H$ | 0xEE00 0000$_H$ |
| K4 | 0x7710$_H$ | 0x27$_H$ | 0xEE 2000$_H$ | 0x4E00 0000$_H$ |
| K5 | 0x7710$_H$ | 0x77$_H$ | 0xEE 2000$_H$ | 0xEE00 0000$_H$ |
| K6 | 0x7770$_H$ | 0x71$_H$ | 0xEE E000$_H$ | 0xE200 0000$_H$ |
| ... | | | | |

PWT

AUTOMATION CONTROLLER AND METHOD FOR OPERATING THE AUTOMATION CONTROLLER

BACKGROUND OF THE INVENTION

1. Field of the Invention

The invention relates to an automation controller comprising a processor, onto which an operating system is loaded, a first interface module with at least a first Ethernet channel and a second Ethernet channel, which are connected to a first selection circuit, a second interface module with at least a first Ethernet channel and a second Ethernet channel, which are connected to a second selection circuit, a first network interface for connection to a first network and a second network interface for connection to a second network, connector switched off to connect the selection circuits with the network interfaces, a first register with a first register value and a second register with a second register value, where the selection circuits are configured to assign the Ethernet channels to the network interfaces in accordance with the register values.

2. Description of the Related Art

Particularly when an automation controller is formed as an automation control unit configured for functional safety, safety-related settings, such as hardware configurations, are not permitted to be falsified and must be protected accordingly at runtime. A protection of this type previously occurred in what are known as F-CPUs (failsafe) from a user program. This convention solution cannot be applied to values to be protected which cannot be reached on the user program. Identifying a possible falsification must also occur in a stopped state of the automation controller or without the assistance of a safety program (F program/user program).

SUMMARY OF THE INVENTION

In view of the foregoing, it is accordingly an object of the present invention to provide an automation controller which reliably identifies falsifications, in particular, falsifications of register values for network interface assignments.

This and other objects and advantages are achieve in accordance with the invention by an automation controller in which the operating system is configured to generate a number, in a definable cycle, and a query stage is present, which is configured to apply a logical function to the register values with the generated number with each cycle, as a result of which a return value is produced. The operating system is further configured to reapply the logical function to the return value with the generated number, as a result of which the register values are produced again. Furthermore code instructions are present which are configured to compare the reproduced register values with test values and to move the automation controller into a safe state in the event of a variance.

A protection of a safety-related value, in particular of the register value, for realizing a network separation, now occurs via a dual input (target value and a test value).

Furthermore, it is advantageous if the actual value is read out cyclically and compared with the test value. In the event of an inequality, a corresponding reaction occurs, e.g., a stop state or fault with switching off of all network interfaces.

Reading out the actual value of the register values could be realized via the following mechanism. A channel to an EDDP (Ethernet Device Driver PNIP) can be defined via the PNIO base packet via an asynchronous service. For instance, using the operating system of the automation controller, a 32 bit random value could be generated every 1000 ms and passed to the EDDP. In the EDDP, the 32 bit random value is XORed with the actual values and supplied back to the operating system. These "actual port" mapping values are then compared with test values by the automation controller with particular code instructions and, in the event of a variance, the automation controller changes into a fault state, for instance, and all physical ports/network interfaces are thus switched off.

In a further embodiment of the automation controller, a test value table with the test values and a combination table, in which combination table the combinations of the assignments of the Ethernet channels to the network interfaces are listed is provided, where a test value assigned to the respective combination is stored in the test value table for each combination. Known test values have now been assigned to the combinations. Consequently, a set port mapping can be cyclically tested against an expectation.

The test is further improved when the automation controller has code instructions, which are established to multiply the first reproduced register value with a first factor and to test whether the product corresponds to the first test value, and to multiply the second reproduced register value with a second factor and to test whether the product corresponds to the second test value.

If a multiplication with $0x200_H$ is made as a first test value and a multiplication with $0x200\ 000_H$ as a second test value, for instance, then a change in the register content by just one bit (lowest value) can thus also be detected with the test at runtime.

With respect to a Profisafe application, it is advantageous if the register values are selected for the assignment of the Ethernet channels to the network interfaces so that it is ensured that the first network and the second network are separated from one another.

Such a safety-related setting of the register values must be protected against falsification as a result of hardware and software errors. This setting (register values) relates to the function "network separator in accordance with International Electrotechnical Commission (IEC) standard 61784-3-3 (Profisafe)", which is made available by a failsafe CPU (F-CPU). The protection can advantageously also be implemented effectively without a user program (F program) or also in the stop.

In the context of the invention, a network separator is understood to mean an absolute network separator between two network interfaces. In the event that the first network interface and the second network interface belong to different local Ethernet interfaces or networks, it is not permitted to implement bridges on the communication level 2 for these interfaces. If the first interface is to lead to a local Ethernet network and the other to a backplane bus module of the automation controller with an Ethernet interface, then it is also not permitted to implement bridges on the communication level 2 for this configuration.

It is advantageous if the automation controller has an input stage, which is configured such that a user can select and set the combinations. A user could select the interface variants or combinations via a display on the automation controller, for instance. The user could confirm the selected combination by confirming the associated test value.

The objects and advantages in accordance with the invention are also achieved by a method for operating an automation controller, where for network separation of a first network and a second network, a first register value of a first register and a second register value of a second register is monitored against falsifications as a result of hardware and software errors, where the register values are used to set a first or second selection circuit, and here the selection circuits are operated to assign Ethernet channels of interface modules to network interfaces and thus the networks in accordance with the register values. In addition, a number is generated from an operating system of the automation controller in a definable cycle and with each cycle a logical function is also applied to the register values with the number, as a result of which a return value is produced, in which operating system the logical function is in turn applied to the return value with the number, as a result of which the register values are produced again. Furthermore, code instructions are run through, which compare the reproduced register values with test values and in the event of 0a variance move the automation controller into a safe state.

With respect to an implementation of the code instruction, a test value table with test values and a combination table has proven to be useful, combinations of the assignments of the Ethernet channels to the network interfaces are listed in the combination table and used for the comparison, where a test value assigned to the respective combination is stored in the test value table for each combination.

In order to also be able to identify changes of just 1 bit, the first reproduced register value is multiplied with a first factor and a test is performed to determine whether the product corresponds to the first test value, and the second reproduced register value is multiplied with a second factor and a test is performed to determine whether the product corresponds to the second test value.

If an automation controller is operated in respect of functional safety, then it is advantageous if the automation controller is operated as an automation control unit configured for functional safety and the network separation of the first network and the second network occurs in accordance with IEC standard 61784-3.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings show an exemplary embodiment of the invention, in which:

FIG. 2 is a combination table in accordance with the invention;

FIG. 3 is a test value table in accordance with the invention;

DETAILED DESCRIPTION OF THE EXEMPLARY EMBODIMENTS

Figure 1:
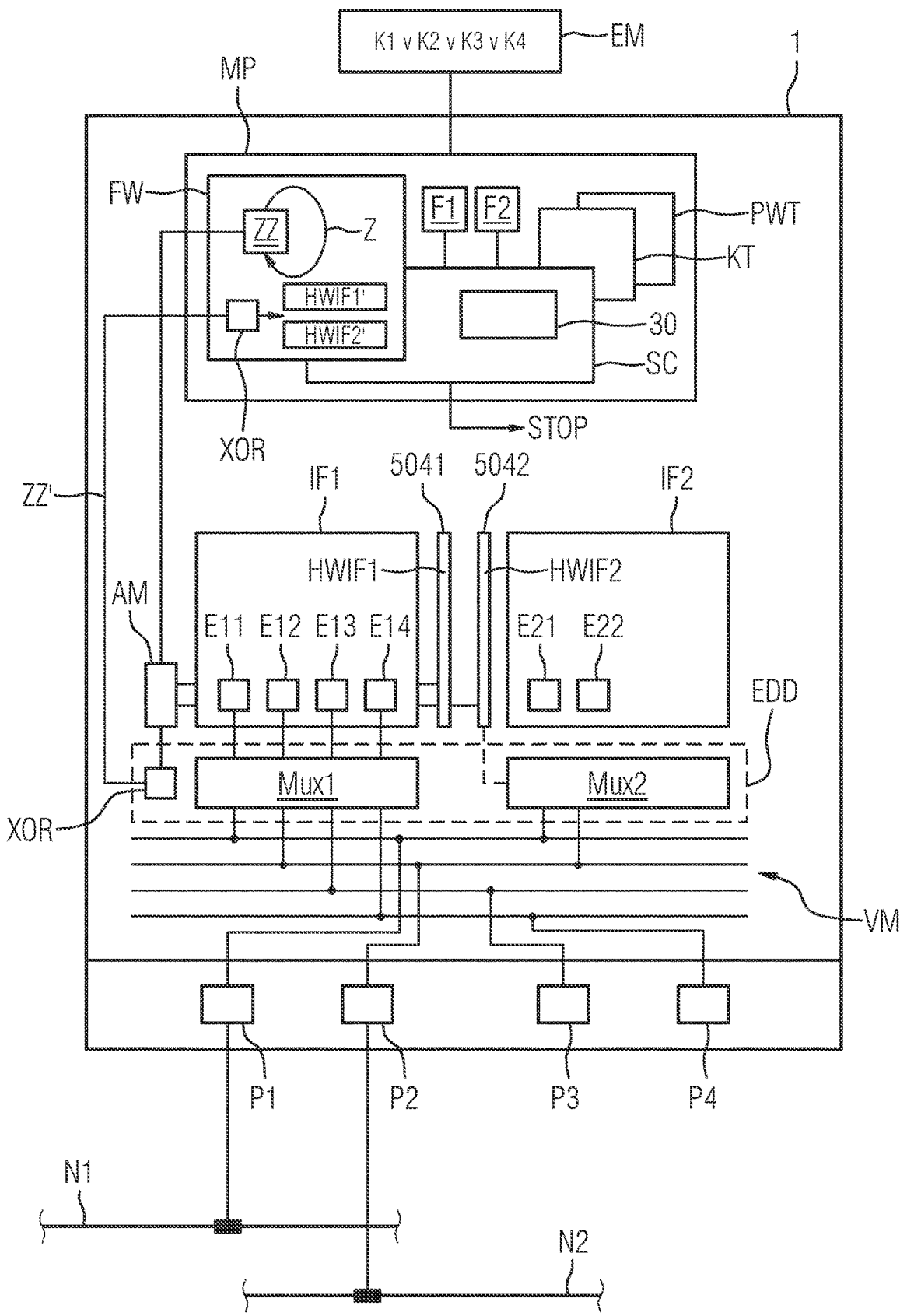
FIG. 1 is schematic illustration of an automation controller in accordance with the invention.

The drawings show an exemplary embodiment of the invention, in which:

FIG. 1 shows an automation controller 1. The automation controller 1 has a processor MP, onto which an operating system FW is loaded. For communication connections, the automation controller 1 has a first interface module IF1 and a second interface module IF2. The first interface module IF1 is configured, for instance, as a PN-IP 100 megabit/s module. The second interface module IF2 is configured as a PN-IP 100 gigabit/s module. Selection circuits Mux1, Mux2 are arranged between the interface modules IF1, IF2 and network interfaces P1, . . . , P4. The first interface module IF1 has a first Ethernet channel E11, a second Ethernet channel E12, a third Ethernet channel E13 and a fourth Ethernet channel E14. As a result, different Ethernet channels E11, . . . , E14 can accordingly be connected to different network interfaces P1, P2, P3, P4 via the selection circuits Mux1, Mux2. To this end, the automation controller 1 has a first register 5041 with a first register value HWIF1 and a second register 5042 with a second register value HWIF2. The selection circuits Mux1, Mux2 are configured to assign the Ethernet channels E11, . . . , E22 to the network interfaces P1, P2, P3, P4 in accordance with the register values HIF1, HIF2. The assignment is safety-related in particular to a functionality of a network separator in a Profisafe environment. As a result, the assigned register values HWIF1, HWIF2 must be monitored.

To this end, the operating system FW is configured to generate a number ZZ, e.g., a random number, in a definable cycle Z and via a query stage AM, which is configured to apply a logical function to the register values HWIF1, HWIF2 with the number ZZ with each cycle Z. As a result, a return value ZZ' is produced and fed back to the operating system FW. In the operating system FW, the logical function XOR is again applied to the back-fed return value ZZ' with the number ZZ, as a result of which the register values HHIF1', HWIF2' are again produced. For a further test, code instructions SC are present, which are established to compare reproduced register values HWIF1', HWIF2' with test values CV_HWIF1, CV_HWIF2 (see FIG. 3) and in the event of a variance to move the automation controller 1 into a safe state. To this end, a comparator 30 is provided, for instance, which forces the automation controller 1 into a stop state.

The code instructions SC are also configured to multiply the first reproduced register value HWIF1' with a first factor F1 and to test whether the product corresponds to the first test value CV_HWIF1 and to multiply the second register value HWIF2' with a second factor F2 and to test whether the product corresponds to the second test value CV_HWIF2.

As an exemplary configuration of the automation controller 1 with respect to a network separator, the sixth combination K6 is selected from the configuration table KT shown in FIG. 2. The sixth combination K6 provides that the first Ethernet channel E11 of the first interface module IF1 is connected to the first network interface P1 and the second Ethernet channel E12 of the second interface module IF2 is connected to the second network interface P2.

The following register values are produced from FIG. 3 for the sixth combination K6. The first register value HWIF1 obtains the value $0x7770_H$ and the second register value HWIF2 obtains the value $0x71_H$. Accordingly, the test values $0xEE E000_H$ and $0xE200 0000_H$ are selected for the first register value HWIF1 and the second register value HWIF2 in the sixth combination K6. This means that a multiplication of the register value $0x770_H$ with $0x200_H$ must produce the corresponding test value $0xEE E000_H$.

Figure 4:
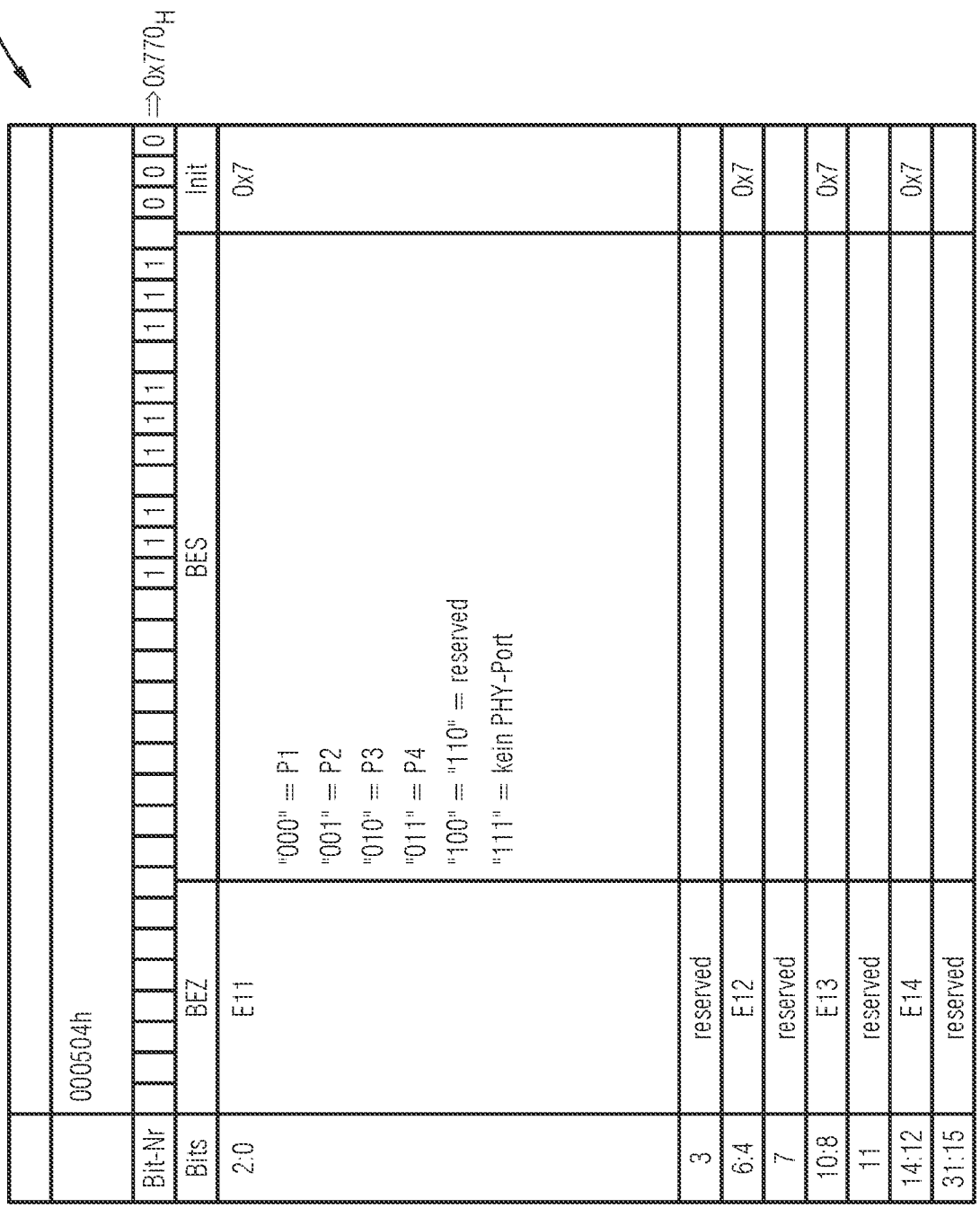
FIG. 4 is an illustration of an allocation of a register with a register value in accordance with the invention.

In the example of the first register 5041, FIG. 4 shows a possible assignment. The first register 5041 has the address 000504H. In a line with the designation bit number, 32 bits can be allocated for the register. The configuration $0x7770_H$ was allocated as an example. This means that the bits 0 to 2 are assigned with 0, the bits 4 to 6 are assigned with 1, the bits 8 to 10 are likewise assigned with 1 and the bits 12 to 14 are also assigned with 1. Binary numbers can be divided into groups of four and simply converted into hexadecimal numbers, i.e. one block with four "1" corresponds to a "7". In the explanatory column for the bit numbers 0 to 2, it is shown that a configuration with "000" has the same meaning as a link to the first network interface P1, an assignment of the bits "001" corresponds to a link to the second network interface E2, an assignment of the bits with "010" corresponds to a link to the third network interface P3 and an assignment with "011" corresponds to a link to the fourth network interface P4. The assignment of the bits with "100" to "110" is reserved and behaves like the assignment with "111" which is to be equated with no network interface allocation.

All bits receive $0x7_H$ as the initial value, which in turn corresponds to "111" and thus does not represent a port allocation in respect of safety.

Figure 5:
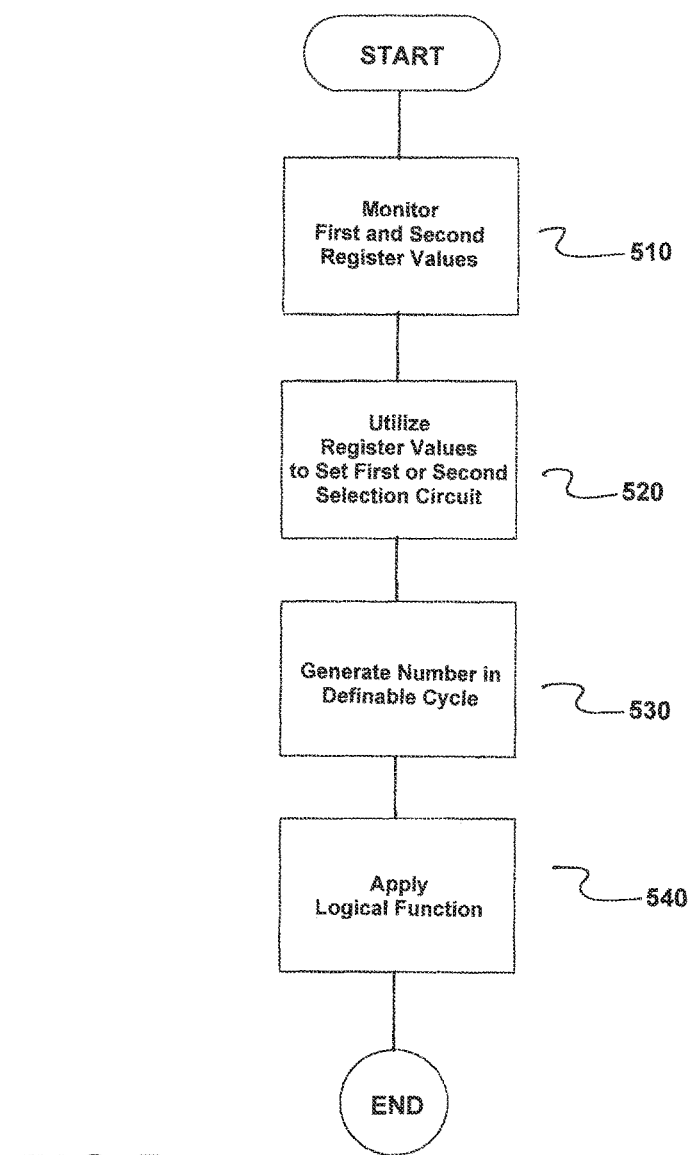
FIG. 5 is a flowchart of the method in accordance with the invention.

FIG. 5 is a flowchart of the method for operating an automation controller 1 in accordance with the invention. The method comprises monitoring, for network separation of a first network N1 and a second network N2, a first register value HWIF1 of a first register 5041 and a second register value HWIF2 of a second register 5042 for falsifications as a result of hardware and software errors, as indicated in step 510.

Next, the first and second register values HWIF1, HWIF2 are used to set a first or second selection circuit Mux1, Mux2, as indicated in step 520. Here, the first and second selection circuits Mux1, Mux2 are operated to assign Ethernet channels E11, . . . , E22 of interface modules IF1, IF2 to network interfaces P1, P2 such that the first and second networks NW1, NW2 are assigned in accordance with the first and second register values HWIF1, HWIF2.

Next, a number ZZ from an operating system FW of the automation controller 1 is generated in a definable cycle Z and a logical function XOR is applied with each cycle Z to the first and second register values HWIF1, HWIF2 with the number Z to produce a return value Z', as indicated in step 530.

In accordance with the method, the logical function XOR is applied within the operating system FW to the return value Z' with the number ZZ such that the first and second register values HWIF1', HWIF2' are produced. Furthermore, code instructions SC are run through, which compare reproduced first and second register values HWIF1', HWIF2' with test values CV_HWIF1, CV_HWIF2. In accordance with the method, the automation controller 1 is moved into a safe state in an event of a variance.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An automation controller comprising:
   a processor onto which an operating system is loaded;
   a first interface module including at least a first Ethernet channel and a second Ethernet channel, the first and second Ethernet channels being connected to a first selection circuit;
   a second interface module including at least another first Ethernet channel and another second Ethernet channel, the other first and second Ethernet channels being connected to a second selection circuit;
   a first network interface for connection to a first network and a second network interface for connection to a second network;
   a connector configured to connect the selection circuits with the first and second network interfaces;
   a first register including a first register value and a second register having a second register value, the first and second selection circuits being configured to assign the first and second Ethernet channels and the other first and second Ethernet channels to the first and second network interfaces in accordance with the first and second register values;
   wherein the operating system is configured to generate a number in a definable cycle and a query stage applies a logical function to the register values with the generated number with each cycle to produce a return value; and
   wherein the operating system is further configured to apply the logical function to the produced return value with the generated number such that the first and second register values are reproduced, code instructions comparing the reproduced first and second register values with test values and, in an event of a variance, the automation controller being moved into a safe state.

2. The automation controller as claimed in claim 1, further comprising:
   a test value table with test values; and
   a combination table, in which combinations of the assignments of the first and second Ethernet channels and the other first and second Ethernet channels to the network interfaces are listed;
   wherein a test value assigned to a respective combination is stored in the test value table for each combination of the assignments of the first and second Ethernet channels and the other first and second Ethernet channels.

3. The automation controller as claimed in claim 2, wherein the code instructions are established to multiply the first reproduced register value with a first factor and to test whether a product of the multiplication of the first reproduced register value with the first factor corresponds to the first test value and to multiply the second reproduced register value with a second factor and to test whether a product of the second reproduced register value with the second factor corresponds to the second test value.

4. The automation controller as claimed in claim 3, wherein the first and second register values for the assignment of the first and second Ethernet channels and the other first and second Ethernet channels to the first and second network interfaces are selected to ensure the first network and the second network are separated from one another.

5. The automation controller as claimed in claim 2, wherein the first and second register values for the assignment of the first and second Ethernet channels and the other first and second Ethernet channels to the first and second network interfaces are selected to ensure the first network and the second network are separated from one another.

6. The automation controller as claimed in claim 2, further comprising:
   an input stage configured to permit a user to select and set the combinations.

7. The automation controller as claimed in claim 1, wherein the first and second register values for the assignment of the first and second Ethernet channels and the other first and second Ethernet channels to the first and second network interfaces are selected to ensure the first network and the second network are separated from one another.

8. A method for operating an automation controller, the method comprising:
   monitoring, for network separation of a first network and a second network, a first register value of a first register and a second register value of a second register for falsifications as a result of hardware and software errors;
   utilizing the first and second register values to set a first or second selection circuit, the first and second selection circuits being operated to assign Ethernet channels of interface modules to network interfaces such that the first and second networks are assigned in accordance with the first and second register values;
   generating a number from an operating system of the automation controller in a definable cycle; and
   applying a logical function with each cycle to the first and second register values with the number to produce a return value;
   wherein the logical function is applied within the operating system to the return value with the number such that the first and second register values are produced;
   wherein code instructions are run through, which compare reproduced first and second register values with test values; and
   wherein automation controller is moved into a safe state in an event of a variance.

9. The method as claimed in claim 8, wherein a test value table with the first and second test values and a combination table, in which combinations of the assignments of the Ethernet channels to the network interfaces are listed, is utilized; and wherein a test value assigned to the respective combination is stored in the test value table for each combination.

10. The method as claimed in claim 9, wherein via the code instructions the first reproduced register value is multiplied with a first factor and a test is performed to determine whether a product corresponds to a first test value and the second reproduced register value is multiplied with a second factor and another test is performed to determine whether another product corresponds to the second test value.

11. The method as claimed in claim 9, wherein the automation controller is operated as an automation control unit configured for functional safety and the network separation of the first network and the second network is performed in accordance with International Electrotechnical Commission (IEC) standard 61784-3.

12. The method as claimed in claim 8, wherein via the code instructions the first reproduced register value is multiplied with a first factor and a test is performed to determine whether a product corresponds to a first test value and the second reproduced register value is multiplied with a second factor and another test is performed to determine whether another product corresponds to the second test value.

13. The method as claimed in claim 12, wherein the automation controller is operated as an automation control unit configured for functional safety and the network separation of the first network and the second network is performed in accordance with International Electrotechnical Commission (IEC) standard 61784-3.

14. The method as claimed in claim 8, wherein the automation controller is operated as an automation control unit configured for functional safety and the network separation of the first network and the second network is performed in accordance with International Electrotechnical Commission (IEC) standard 61784-3.

* * * * *